(12) United States Patent
Liu

(10) Patent No.: US 11,269,210 B2
(45) Date of Patent: Mar. 8, 2022

(54) OPTICAL ASSEMBLY AND DISPLAY APPARATUS

(71) Applicant: WUHAN CHINA STAR OPTOELECTRONICS TECHNOLOGY CO., LTD., Hubei (CN)

(72) Inventor: Fancheng Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 531 days.

(21) Appl. No.: 16/308,922

(22) PCT Filed: Nov. 1, 2018

(86) PCT No.: PCT/CN2018/113265
§ 371 (c)(1),
(2) Date: Dec. 11, 2018

(87) PCT Pub. No.: WO2020/062414
PCT Pub. Date: Apr. 2, 2020

(65) Prior Publication Data
US 2021/0223607 A1 Jul. 22, 2021

(30) Foreign Application Priority Data
Sep. 28, 2018 (CN) .......................... 201811139519.2

(51) Int. Cl.
*G02F 1/1335* (2006.01)
*G02F 1/1333* (2006.01)
*G02B 1/11* (2015.01)

(52) U.S. Cl.
CPC .......... *G02F 1/133502* (2013.01); *G02B 1/11* (2013.01); *G02F 1/133331* (2021.01); *G02F 1/133528* (2013.01); *G02F 2201/38* (2013.01)

(58) Field of Classification Search
CPC ......... G02F 1/133502; G02F 1/133528; G02F 2202/28; G02F 2201/38; G02F 1/133331; G02B 1/11; G02B 5/3025
See application file for complete search history.

(56) References Cited

U.S. PATENT DOCUMENTS

| 2008/0297754 | A1* | 12/2008 | Kamenov | ........... G03F 7/70191 |
| | | | | 355/67 |
| 2010/0196655 | A1* | 8/2010 | Kai | ........................ H01J 11/44 |
| | | | | 428/110 |
| 2010/0289939 | A1* | 11/2010 | Ogino | ............... H01L 27/14627 |
| | | | | 348/340 |
| 2014/0125900 | A1* | 5/2014 | Li | ..................... G02F 1/133308 |
| | | | | 349/42 |

(Continued)

*Primary Examiner* — Jia X Pan

(57) ABSTRACT

An optical assembly and a display apparatus are provided. The optical assembly includes a cover plate, an optical transparent adhesive, a polarizer, a display panel, and an antireflection coating. The antireflection coating is disposed at a location corresponding to a camera, and is configured to reduce the reflectivity of incident light entering the camera. The antireflection coating is disposed at the location corresponding to the camera, so as to reduce the reflectivity of the incident light entering the camera, thereby increasing a mount of admitted light of the camera.

15 Claims, 7 Drawing Sheets

(56) References Cited

U.S. PATENT DOCUMENTS

| | | | |
|---|---|---|---|
| 2015/0015958 A1* | 1/2015 | Kim .................. | G02B 27/0006 |
| | | | 359/580 |
| 2019/0079339 A1* | 3/2019 | Fujii ................ | G02F 1/133308 |
| 2019/0278132 A1* | 9/2019 | Nakamura ........... | G02B 5/3075 |
| 2020/0117034 A1* | 4/2020 | Yin .................. | G02F 1/133528 |

* cited by examiner

OPTICAL ASSEMBLY AND DISPLAY APPARATUS

FIELD OF DISCLOSURE

The present disclosure relates to the field of display technologies, and in particular, to an optical assembly and a display apparatus.

BACKGROUND

With rapid development of mobile terminals, a mobile terminal becomes an indispensable tool in people's life, and brings great convenience to various aspects of life of users. After a user gets used to an ordinary display screen, to bring a better visual experience and visual feeling to users, a full screen emerges as the times require. The full screen is a display screen whose screen-to-body ratio is approximately 100%.

As shown in FIG. 1a, because the screen-to-body ratio of the full screen is approximately 100%, when a front-facing camera is placed, the camera can be placed only below the display screen, and then a hole is provided at a location on the full screen above the camera, such that the camera can normally operate. However, when a hole is provided on the full screen, treatment such as cutting needs to be performed on a cover plate and a glass substrate, the process is complex, and it is easy to cause abnormal display of the full screen.

As shown in FIG. 1b, to avoid treatment such as cutting that needs to be performed on a cover plate and a glass substrate, the prior art provides an innovative manner. That is, no cutting is performed on the cover plate and the glass substrate, only a polarizer and an optical clear adhesive in an area above a camera are removed, and the cover plate and a display panel are reserved. The manner reduces process complexity to an extent, but also has some problems:

As shown in FIG. 1c, only after being reflected a plurality of times at a cover plate and a display panel, incident light (incident light of a camera) can enter the camera, and these times of reflection reduce a mount of admitted light of the camera, and further interfere with imaging quality of the camera.

That is, the prior art has a technical problem that incident light has a relatively large reflectivity when entering a camera.

SUMMARY OF THE DISCLOSURE

The present disclosure provides an optical assembly and a display apparatus, so as to alleviate a technical problem existing in the prior art that incident light has a relatively large reflectivity when entering a camera.

To resolve the above problem, technical solutions provided in the present disclosure are as follows:

An embodiment of the present disclosure provides an optical assembly, applied to a mobile terminal including a camera and including: a cover plate, an optical transparent adhesive, a polarizer, a display panel, and an antireflection coating, where the cover plate is light-transmissive and adheres to a first surface of the polarizer using the optical transparent adhesive;

a second surface of the polarizer adheres to a first surface of the display panel;

the polarizer is provided with a through-hole at a location corresponding to the camera;

the display panel is provided with a through-hole area at the location corresponding to the camera; and the display panel includes a display substance, and the display substance is not included in the through-hole area; and the antireflection coating is disposed at the location corresponding to the camera, and is configured to reduce the reflectivity of incident light entering the camera.

In the optical assembly of the present disclosure, the antireflection coating is disposed on an outer surface of the cover plate away from the camera.

In the optical assembly of the present disclosure, the antireflection coating covers the outer surface of the cover plate away from the camera.

In the optical assembly of the present disclosure, the antireflection coating is disposed on the first surface of the display panel.

In the optical assembly of the present disclosure, within the through-hole area, the antireflection coating covers the first surface of the display panel.

In the optical assembly of the present disclosure, within the through-hole area, the polarizer covers the antireflection coating.

In the optical assembly of the present disclosure, the antireflection coating includes a first antireflection coating and a second antireflection coating, the first antireflection coating is disposed on an outer surface of the cover plate away from the camera, and the second antireflection coating is disposed on the first surface of the display panel.

In the optical assembly of the present disclosure, the display panel includes an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the antireflection coating is disposed in a hollow area in the opaque hollow column body.

In the optical assembly of the present disclosure, the display panel includes an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the antireflection coating includes a first antireflection coating and a second antireflection coating, the first antireflection coating is disposed on an outer surface of the cover plate away from the camera, and the second antireflection coating is disposed on a first surface of the color film substrate.

In the optical assembly of the present disclosure, the display panel includes an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the antireflection coating includes a first antireflection coating and a second antireflection coating, the first antireflection coating is disposed on an outer surface of the cover plate away from the far camera, and the second antireflection coating is disposed on a surface of the array substrate away from the far camera.

In the optical assembly of the present disclosure, the display panel includes an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the antireflection coating includes a first antireflection coating and a second antireflection coating, the first antireflection coating is disposed on a first surface of the color film substrate, and the second antireflection coating is disposed on a surface of the array substrate away from the far camera.

In the optical assembly of the present disclosure, the display panel includes an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the antireflection coating includes a first antireflection coating, a second antireflection coating, and a third antireflection coating, the first antireflection coating is disposed on an outer surface of the cover plate away from the camera, the second antireflection coating is disposed on a first surface of the color film substrate, and the third antireflection coating is disposed on a surface of the array substrate away from the far camera.

In the optical assembly of the present disclosure, the antireflection coating includes a first light-transmissive film layer and a second light-transmissive film layer, the first light-transmissive film layer is disposed on a side surface of the second light-transmissive film layer away from the camera, and the second light-transmissive film layer is disposed on a transparent plate; and a refractive index of the first light-transmissive film layer is less than a refractive index of the second light-transmissive film layer, and the refractive index of the second light-transmissive film layer is greater than a refractive index of the transparent plate.

In the optical assembly of the present disclosure, the transparent plate includes at least one of a cover plate, a display panel, an array substrate, and a color film substrate.

In the optical assembly of the present disclosure, a thickness of the first light-transmissive film layer is equal to odd-numbered times a quarter wavelength of the incident light.

In the optical assembly of the present disclosure, a thickness of the second light-transmissive film layer is equal to odd-numbered times a quarter wavelength of the incident light.

In the optical assembly of the present disclosure, a thickness of the first light-transmissive film layer is the same as that of the second light-transmissive film layer.

In the optical assembly of the present disclosure, the refractive index of the first light-transmissive film layer is 1.3, and the refractive index of the second light-transmissive film layer is 1.5.

In the optical assembly of the present disclosure, the material of the first light-transmissive film layer includes magnesium fluoride, and the material of the second light-transmissive film layer is indium tin oxide.

Moreover, an embodiment of the present disclosure provides a display apparatus, including a camera and an optical assembly that is provided in the present disclosure.

Beneficial effects of the present disclosure are: The present disclosure provides an innovative optical assembly applied to a mobile terminal including a camera and including: a cover plate, an optical transparent adhesive, a polarizer, a display panel, and an antireflection coating, where the cover plate is light-transmissive and adheres to a first surface of the polarizer using the optical transparent adhesive; a second surface of the polarizer adheres to a first surface of the display panel; the polarizer is provided with a through-hole at a location corresponding to the camera; the display panel is provided with a through-hole area at the location corresponding to the camera; and the display panel includes a display substance, and the display substance is not included in the through-hole area; and the antireflection coating is disposed at the location corresponding to the camera, and is configured to reduce the reflectivity of incident light entering the camera. The antireflection coating is disposed at the location corresponding to the camera, to reduce the reflectivity of the incident light entering the camera, thereby alleviating the technical problem existing in the prior art that incident light has a relatively large reflectivity when entering a camera, increasing a mount of admitted light of the camera, reducing interference from reflection with imaging quality of the camera, and enhancing use experience of a user.

BRIEF DESCRIPTION OF THE DRAWINGS

To describe the technical solutions in the embodiments or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1A:
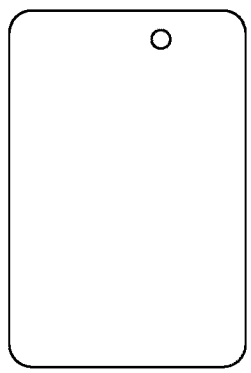
FIG. 1*a* is a schematic diagram of a full screen.
Figure 1B:
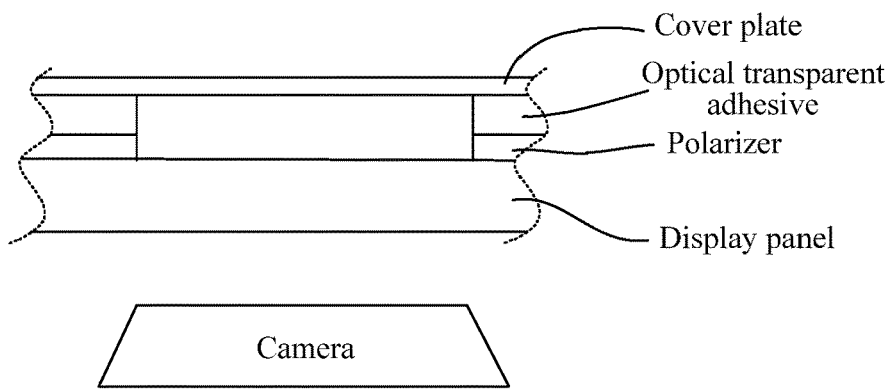
FIG. 1*b* is a schematic cross-sectional diagram of a camera area of an existing full screen.
Figure 1C:
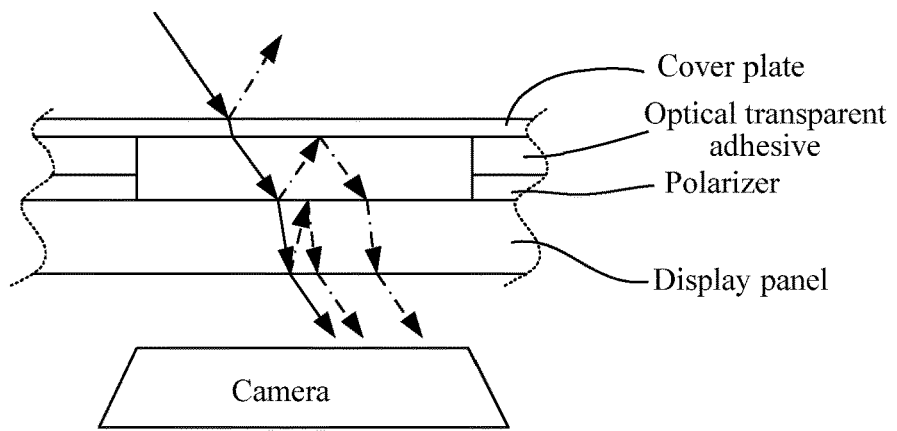
FIG. 1*c* is a schematic diagram of admitted light of a camera area of an existing full screen.

The following embodiments are described with reference to the accompanying drawings, and are used to exemplify particular embodiments that the present disclosure can be used to implement. Direction terms mentioned in the present disclosure such as "upper", "lower", "front", "rear", "left", "right", "inner", "outer", and "side" are only directions with reference to the accompanying drawings. Therefore, the used direction terms are intended to describe and understand the present disclosure, but are not intended to limit the present disclosure. In the drawings, units whose structures are same are indicated using same reference numbers.

For the technical problem existing in the prior art that incident light has a relatively large reflectivity when entering a camera, the present disclosure can alleviate this technical problem.

Figure 2:
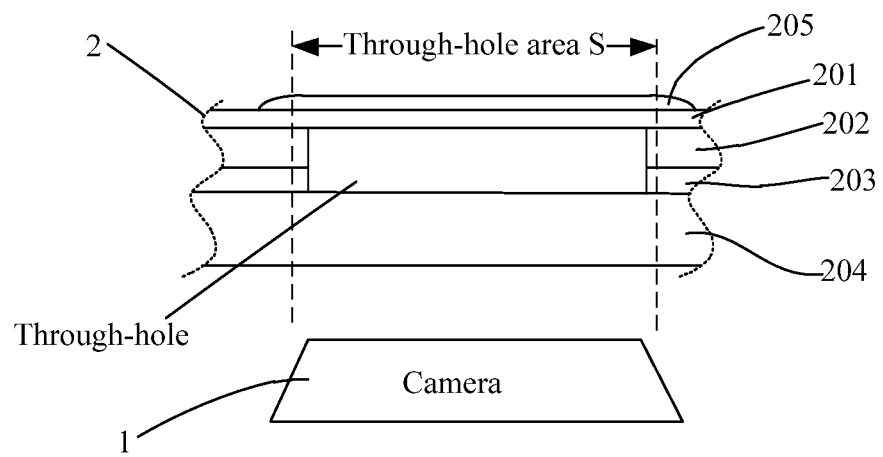
FIG. 2 is a first schematic cross-sectional diagram of a camera area of an optical assembly according to an embodiment of the present disclosure.

FIG. 2 is a first schematic cross-sectional diagram of a camera area of an optical assembly according to an embodiment of the present disclosure. An optical assembly 2 applied to a mobile terminal including a camera 1 and provided in the present disclosure includes: a cover plate 201, an optical transparent adhesive 202, a polarizer 203, a display panel 204, and an antireflection coating 205, where the cover plate 201 is light-transmissive and adheres to a first surface of the polarizer 203 using the optical transparent adhesive 202; a second surface of the polarizer 203 adheres to a first surface of the display panel 204; the polarizer 203 is provided with a through-hole at a location corresponding to the camera 1; the display panel 204 is provided with a through-hole area S at the location corresponding to the camera 1; the display panel includes a display substance, and the display substance is not included in the through-hole area; and the antireflection coating 205 is disposed at the location corresponding to the camera 1, and is configured to reduce the reflectivity of incident light entering the camera 1.

In an embodiment, the cover plate may be a rectangular cover plate, or may be a cover plate obtained after rounding a rectangle.

In an embodiment, the cover plate may be a glass cover plate, or may be a cover plate made of another material, for example, a cover plate made of a composite material.

In an embodiment, the optical transparent adhesive may be understood as a special adhesion agent configured to cement a transparent optical element. The optical transparent adhesive may be characterized by being colorless and transparent, having the transmissivity more than 90%, having a good cementing strength, and the like. The optical transparent adhesive may be usually cured at a room temperature or an intermediate temperature, and is characterized by small curing shrinkage and the like. An adhesion agent such as organic silica gel, acrylic acid resin, unsaturated polyester, polyurethane, and epoxy resin may be configured to cement an optical element. During preparation, some treating agents usually need to be added, so as to improve optical performance of the optical transparent adhesive or reduce a curing shrinkage rate. Certainly, the optical transparent adhesive may be optical clear adhesive made of natural resin, or may be optical clear adhesive made of composite resin, or the like.

In an embodiment, the polarizer may filter out some light rays, such that a display screen has a better display effect.

In an embodiment, the display panel may be made of glass including an organic light-emitting diode (embodiments described in FIG. 2 to FIG. 4), or may be made of glass including liquid crystal (embodiments described in FIG. 5 to FIG. 11).

In an embodiment, the polarizer is provided with the through-hole at the location corresponding to the camera, the display panel is provided with the through-hole area at the location corresponding to the camera, and then a light ray may enter the camera using the through-hole and using the through-hole area, such that the camera can normally operate; and then the antireflection coating is disposed to reduce the reflectivity of the incident light entering the camera 1, thereby increasing a mount of admitted light of the camera, reducing interference from reflection with imaging quality of the camera, and enhancing use experience of a user.

An example in which the display panel is made of glass including an organic light-emitting diode is used to further explain and describe the present embodiment of the present disclosure.

In an embodiment, referring to FIG. 2, the antireflection coating 205 is disposed on an outer surface of the cover plate 201 away from the camera 1. This is because this outer surface is the first surface on which the incident light enters the camera, and is also a surface whose reflectivity is maximum. In the present embodiment, the antireflection coating 205 is disposed on the outer surface of the cover plate 201, and the antireflection characteristic of the antireflection coating 205 may be used maximally.

In an embodiment, the antireflection coating 205 covers the outer surface of the cover plate located in the through-hole area S. In this way, the use area of the antireflection coating 205 may be reduced, to reduce device manufacturing costs.

In an embodiment, the antireflection coating 205 covers the outer surface of the cover plate away from the camera. In the present embodiment, a disposition location of the antireflection coating does not need to be positioned. In this way, a positioning manufacturing process of the antireflection coating 205 may be saved, to reduce device manufacturing costs.

Figure 3:
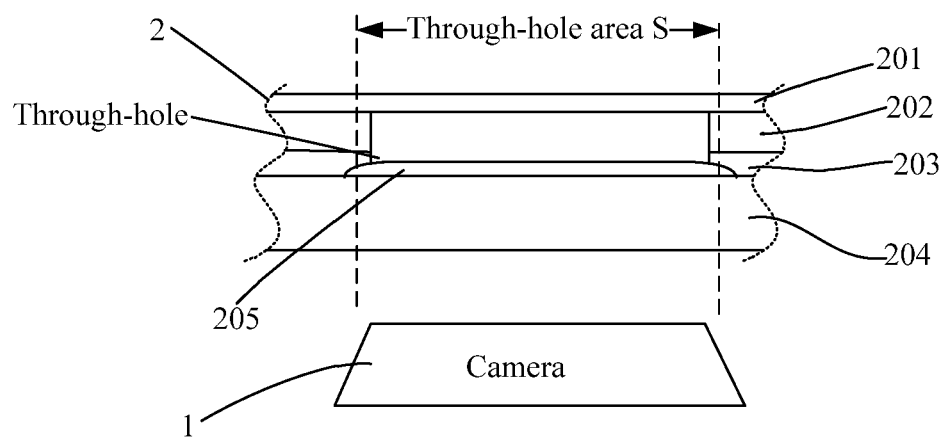
FIG. 3 is a second schematic cross-sectional diagram of a camera area of an optical assembly according to an embodiment of the present disclosure.

In an embodiment, referring to FIG. 3, the antireflection coating 205 is disposed on the first surface of the display panel 204.

In an embodiment, referring to FIG. 3, within the through-hole area, the antireflection coating covers the first surface of the display panel. In this way, a minimal reflectivity of the incident light may be achieved.

In an embodiment, referring to FIG. 3, within the through-hole area, the polarizer 203 covers the antireflection coating 205, such that the antireflection coating 205 may be in close contact with the display panel.

Figure 4:
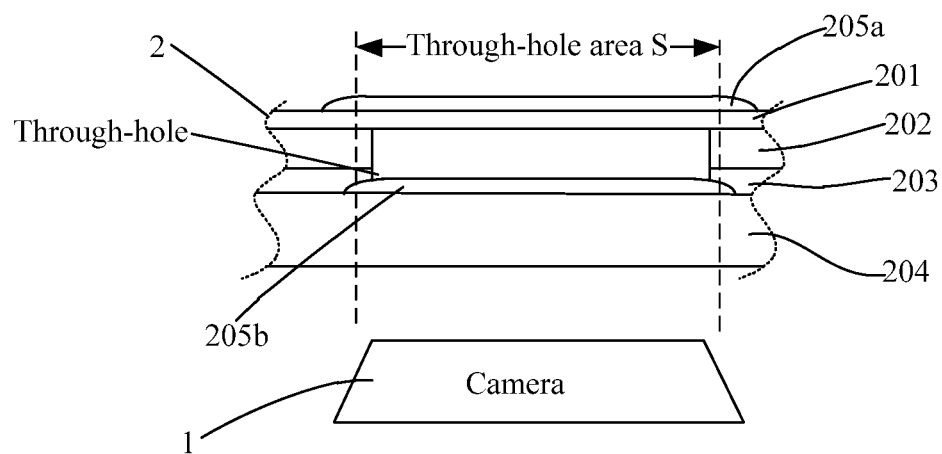
FIG. 4 is a third schematic cross-sectional diagram of a camera area of an optical assembly according to an embodiment of the present disclosure.

In an embodiment, referring to FIG. 4, the antireflection coating 205 includes a first antireflection coating 205a and a second antireflection coating 205b, the first antireflection coating 205a is disposed on an outer surface of the cover plate 201 away from the camera, and the second antireflection coating 205b is disposed on the first surface of the display panel 204. In the present embodiment, an antireflection coating is disposed on each of the cover plate and the display panel, and the antireflection characteristic of the antireflection coating 205 may be maximally used, so as to maximally reduce the reflectivity of the incident light.

An example in which the display panel is made of glass including liquid crystal is used to further explain and describe the present embodiment of the present disclosure.

In the present embodiment, the polarizer 203 includes an upper polarizer and a lower polarizer, and the display substance includes a backlight module and liquid crystal.

Figure 5:
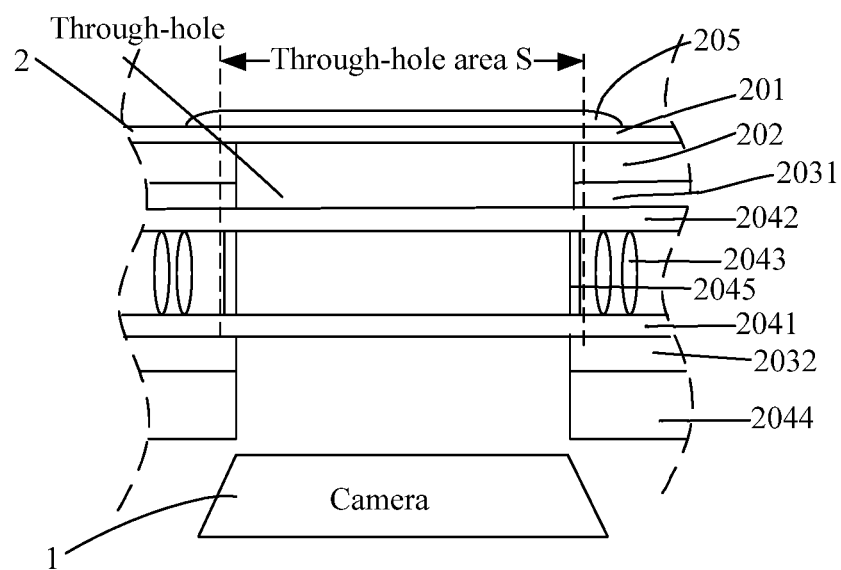
FIG. 5 is a fourth schematic cross-sectional diagram of a camera area of an optical assembly according to an embodiment of the present disclosure.

Referring to FIG. 5, an optical assembly 2 provided in the present disclosure includes: a cover plate 201, an optical transparent adhesive 202, an upper polarizer 2031, a display panel 204, a lower polarizer 2032, and an antireflection coating 205. The display panel 204 includes an array substrate 2041, a color film substrate 2042, liquid crystal 2043, and further includes a backlight module 2044, where the array substrate 2041 and the color film substrate 2042 are cell-assembled together, and the liquid crystal 2043 is disposed between the array substrate 2041 and the color film substrate 2042. In this case, the cover plate 201 is light-transmissive and adheres to a first surface of the upper polarizer 2031 using the optical transparent adhesive 202; a second surface of the upper polarizer 2031 adheres to a first surface of the color film substrate 2042; the upper polarizer 2031 is provided with a through-hole 1 at a location corresponding to the camera 1; the display panel 204 is provided with a through-hole area S at the location corresponding to the camera 1; within the through-hole area S, the display panel 204 is further provided with an opaque hollow column body 2045; the opaque hollow column body 2045 includes no liquid crystal; the array substrate 2041 adheres to a first surface of the lower polarizer 2032; a second surface of the lower polarizer 2032 adheres to an out-light surface of the backlight module 2044; and the antireflection coating 205 is disposed at the location corresponding to the camera 1, and is configured to reduce the reflectivity of incident light entering the camera 1.

In an embodiment, referring to FIG. 5, the antireflection coating 205 is disposed on an outer surface of the cover plate 201 away from the camera 1. This is because this outer surface is the first surface on which the incident light enters the camera, and is also a surface whose reflectivity is maximum. In the present embodiment, the antireflection coating 205 is disposed on the outer surface of the cover plate 201, and the antireflection characteristic of the antireflection coating 205 may be used maximally.

In an embodiment, the antireflection coating 205 covers the outer surface of the cover plate located in the through-hole area S. In this way, the use area of the antireflection coating 205 may be reduced, to reduce device manufacturing costs.

In an embodiment, the antireflection coating 205 covers the outer surface of the cover plate away from the camera. In the present embodiment, a disposition location of the antireflection coating does not need to be positioned. In this way, a positioning manufacturing process of the antireflection coating 205 may be saved, to reduce device manufacturing costs.

Figure 6:
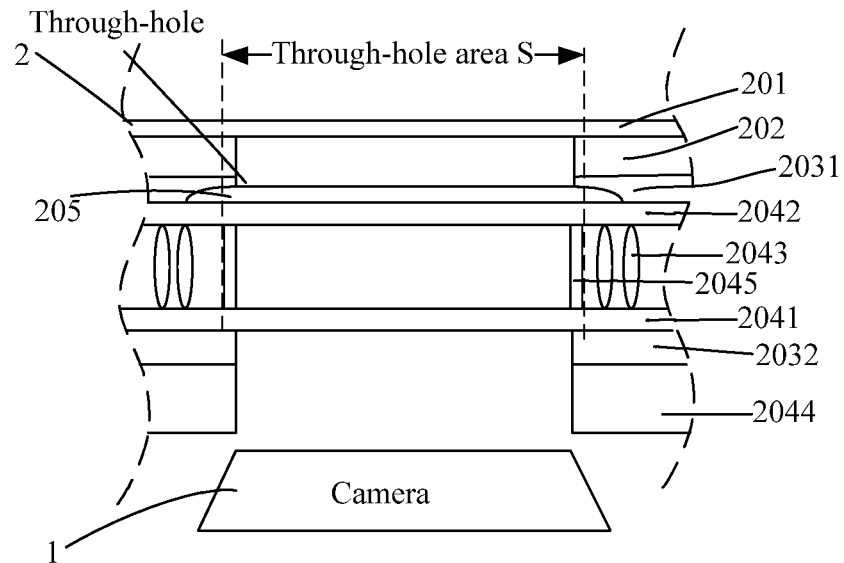
FIG. 6 is a fifth schematic cross-sectional diagram of a camera area of an optical assembly according to an embodiment of the present disclosure.

In an embodiment, referring to FIG. 6, the antireflection coating 205 is disposed on the first surface of the color film substrate 2042.

In an embodiment, referring to FIG. 6, within the through-hole area, the antireflection coating covers the first surface of the color film substrate 2042. In this way, a minimal reflectivity of the incident light may be achieved.

In an embodiment, the antireflection coating 205 is disposed in a hollow area in the opaque hollow column body 2045.

Figure 7:
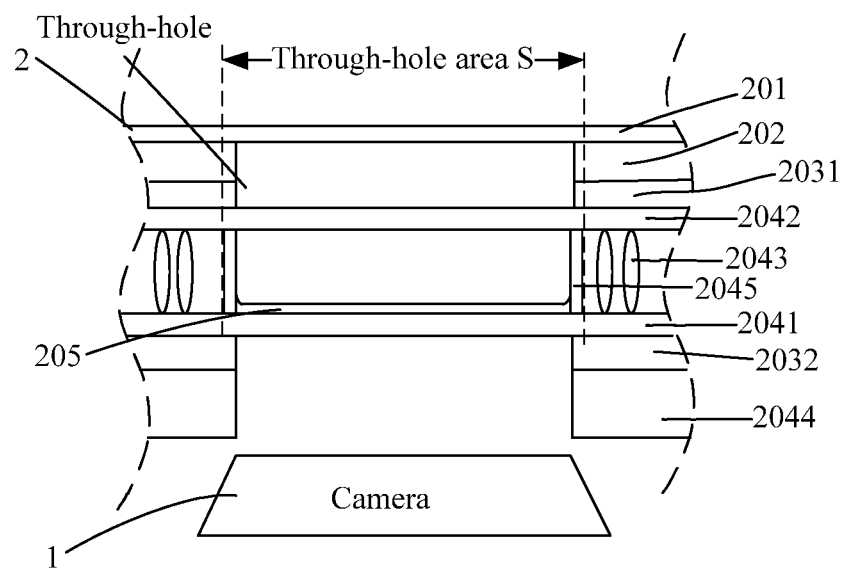
FIG. 7 is a sixth schematic cross-sectional diagram of a camera area of an optical assembly according to an embodiment of the present disclosure.

In an embodiment, referring to FIG. 7, the antireflection coating 205 is disposed on a surface of the array substrate 2041 away from the camera.

Figure 8:
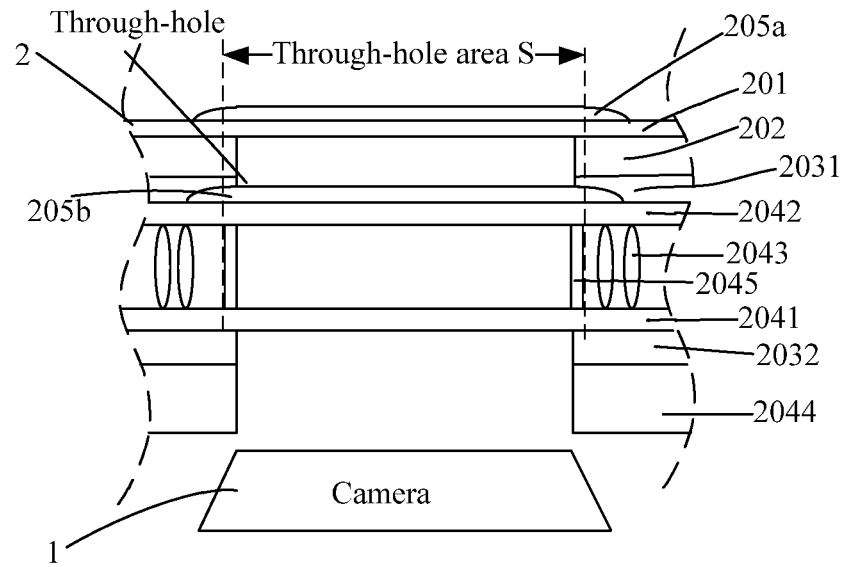
FIG. 8 is a seventh schematic cross-sectional diagram of a camera area of an optical assembly according to an embodiment of the present disclosure.

In an embodiment, referring to FIG. 8, the antireflection coating 205 includes a first antireflection coating 205a and a second antireflection coating 205b, the first antireflection coating 205a is disposed on an outer surface of the cover plate 201 away from the camera, and the second antireflection coating 205b is disposed on the first surface of the color film substrate 2042. In the present embodiment, an antireflection coating is disposed on each of the cover plate and the display panel, and the antireflection characteristic of the antireflection coating 205 may be maximally used, so as to maximally reduce the reflectivity of the incident light.

Figure 9:
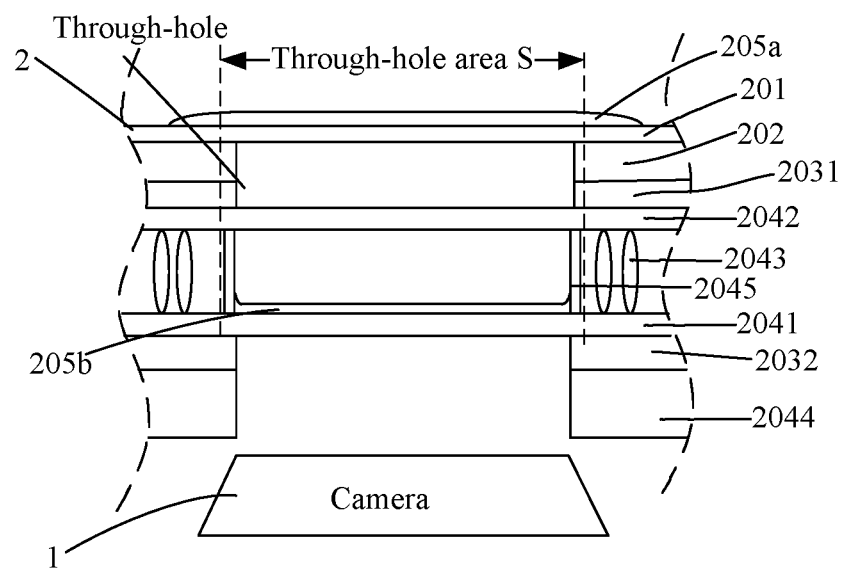
FIG. 9 is an eighth schematic cross-sectional diagram of a camera area of an optical assembly according to an embodiment of the present disclosure.

In an embodiment, referring to FIG. 9, the antireflection coating 205 includes a first antireflection coating 205a and a second antireflection coating 205b, the first antireflection coating 205a is disposed on an outer surface of the cover plate 201 away from the far camera, and the second antireflection coating 205b is disposed on a surface of the array substrate 2041 away from the far camera. In the present embodiment, an antireflection coating is disposed on each of the cover plate and the display panel, and the antireflection characteristic of the antireflection coating 205 may be maximally used, so as to maximally reduce the reflectivity of the incident light.

Figure 10:
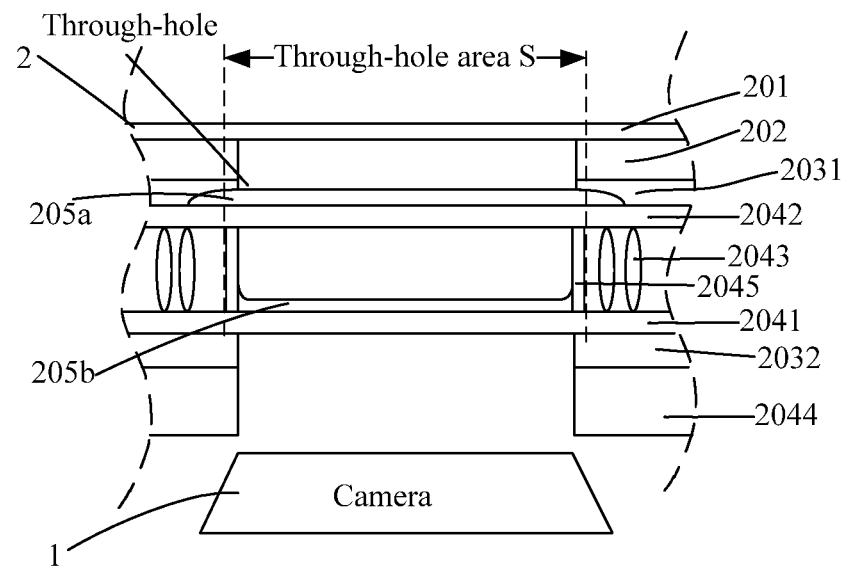
FIG. 10 is a ninth schematic cross-sectional diagram of a camera area of an optical assembly according to an embodiment of the present disclosure.

In an embodiment, referring to FIG. 10, the antireflection coating 205 includes a first antireflection coating 205a and a second antireflection coating 205b, the first antireflection coating 205a is disposed on a first surface of the color film substrate 2042, and the second antireflection coating 205b is disposed on a surface of the array substrate 2041 away from the far camera. In the present embodiment, an antireflection coating is disposed on each of the cover plate and the display panel, and the antireflection characteristic of the antireflection coating 205 may be maximally used, so as to maximally reduce the reflectivity of the incident light.

Figure 11:
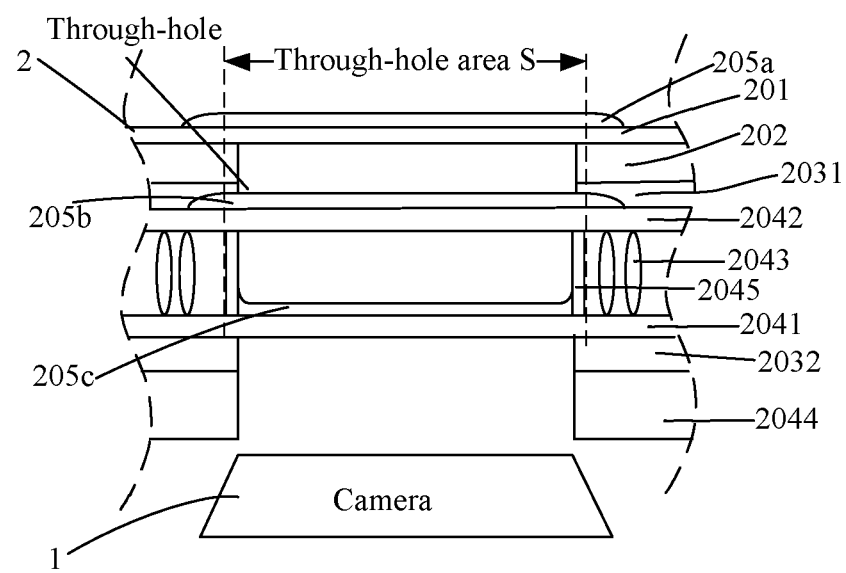
FIG. 11 is a tenth schematic cross-sectional diagram of a camera area of an optical assembly according to an embodiment of the present disclosure.

In an embodiment, referring to FIG. 11, the antireflection coating 205 includes a first antireflection coating 205a, a second antireflection coating 205b, and a third antireflection coating 205c, the first antireflection coating 205a is disposed on an outer surface of the cover plate 201 away from the camera, the second antireflection coating 205b is disposed on a first surface of the color film substrate 2042, and the third antireflection coating 205c is disposed on a surface of the array substrate 2041 away from the far camera. In the present embodiment, an antireflection coating is disposed on each of the cover plate and the display panel, and the antireflection characteristic of the antireflection coating 205 may be maximally used, so as to maximally reduce the reflectivity of the incident light.

In an embodiment, the antireflection coating may be a structure of one or more layers of films, and may be flexibly configured according to different preparation conditions. In the present disclosure, antireflection coatings at different locations may be implemented in different manners.

Currently, an example of a structure of two layers of films is used to perform description.

Figure 12:
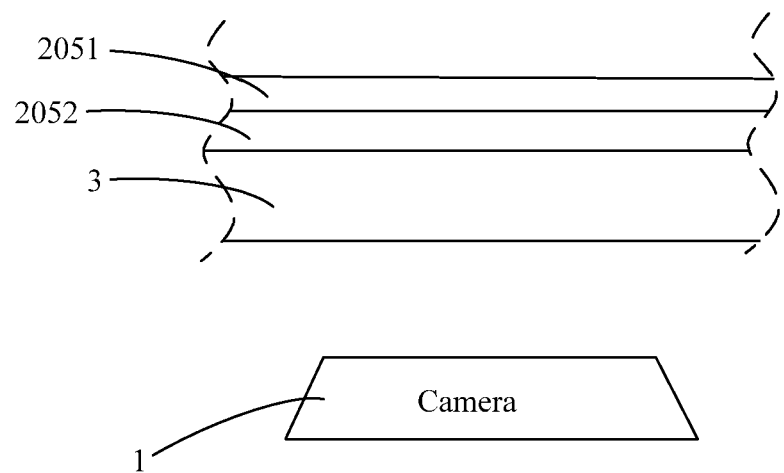
FIG. 12 is a tenth schematic diagram of disposing an antireflection coating according to an embodiment of the present disclosure.

In an embodiment, referring to FIG. 12, the antireflection coating 205 includes a first light-transmissive film layer 2051 and a second light-transmissive film layer 2052, the first light-transmissive film layer 2051 is disposed on a side surface of the second light-transmissive film layer 2052 away from the camera, and the second light-transmissive film layer 2052 is disposed on a transparent plate 3 (which may be one of a cover plate, a display panel, an array substrate, and a color film substrate); and the refractive index n1 of the first light-transmissive film layer is less than the refractive index n2 of the second light-transmissive film layer, and the refractive index n2 of the second light-transmissive film layer is greater than the refractive index n of the transparent plate. In this case, the reflectivity of the antireflection coating 205 is the square of (n2−n1)/(n2+n1), and the reflectivity of the incident light is reduced using a principle of coherent cancellation of a plurality of layers of films.

In an embodiment, when the antireflection coating is disposed on an outer surface of the cover plate, the refractive index of the first light-transmissive film layer is less than the refractive index of the second light-transmissive film layer, and the refractive index of the second light-transmissive film layer is greater than the refractive index of the cover plate.

In an embodiment, when the antireflection coating is disposed on a first surface of the display panel, the refractive index of the first light-transmissive film layer is less than the refractive index of the second light-transmissive film layer, and the refractive index of the second light-transmissive film layer is greater than the refractive index of the display panel.

In an embodiment, when the antireflection coating is disposed on a first surface of the color film substrate, the refractive index of the first light-transmissive film layer is less than the refractive index of the second light-transmissive film layer, and the refractive index of the second light-transmissive film layer is greater than the refractive index of the color film substrate.

In an embodiment, when the antireflection coating is disposed on a surface of the array substrate away from the camera, the refractive index of the first light-transmissive film layer is less than the refractive index of the second light-transmissive film layer, and the refractive index of the second light-transmissive film layer is greater than the refractive index of the array substrate.

In an embodiment, the refractive index n1 of the first light-transmissive film layer is 1.3, and the refractive index n2 of the second light-transmissive film layer is 1.5.

In an embodiment, the material of the first light-transmissive film layer is magnesium fluoride MgF2 or the like, and the material of the second light-transmissive film layer is indium tin oxide ITO or the like.

In an embodiment, the thickness D1 of the first light-transmissive film layer is same as the thickness D2 of the second light-transmissive film layer, and is equal to odd-numbered times a quarter wavelength λ of the incident light. That is, $D1=D2=\lambda \times a \div 4$, where a is an odd number.

In an embodiment, an average value of wavelengths of incident light is 550 nm.

In an embodiment, the thickness of the first light-transmissive film layer is same as the thickness of the second light-transmissive film layer, and is equal to a quarter wavelength λ of the incident light, that is, 137.5 nm.

In an embodiment, the thickness D1 of the first light-transmissive film layer is equal to odd-numbered times a quarter wavelength λ of the incident light.

In an embodiment, the thickness D2 of the second light-transmissive film layer is equal to odd-numbered times a quarter wavelength λ of the incident light.

Moreover, an embodiment of the present disclosure provides a display apparatus, including a camera 1 and an optical assembly 2 that is provided in the present disclosure. The optical assembly is applied to a display device such as a touch smartphone or a TV. A camera in the display device containing the optical assembly may collect more incident light, and interference from reflected light rays is smaller. The surface reflectivity at an opening location corresponding to the camera is reduced, to improve imaging quality of the camera and increase a mount of admitted light of external light entering the camera; and the reduction in the surface reflectivity at the opening location enables consistency of a front surface of a display screen in a screen-off state to be better, to improve the screen taste.

It can be known according to the above embodiments that:

The present disclosure provides an innovative optical assembly applied to a mobile terminal including a camera and including: a cover plate, an optical transparent adhesive, a polarizer, a display panel, and an antireflection coating, where the cover plate is light-transmissive and adheres to a first surface of the polarizer using the optical transparent adhesive; a second surface of the polarizer adheres to a first surface of the display panel; the polarizer is provided with a through-hole at a location corresponding to the camera; the display panel is provided with a through-hole area at the location corresponding to the camera; and the display panel includes a display substance, and the display substance is not included in the through-hole area; and the antireflection coating is disposed at the location corresponding to the camera, and is configured to reduce the reflectivity of incident light entering the camera. The antireflection coating is disposed at the location corresponding to the camera, to reduce the reflectivity of the incident light entering the camera, thereby alleviating the technical problem existing in the prior art that incident light has a relatively large reflectivity when entering a camera, increasing a mount of admitted light of the camera, reducing interference from reflection with imaging quality of the camera, and enhancing use experience of a user.

In conclusion, although the present disclosure has been disclosed through the preferred embodiments as above, the above preferred embodiments are not intended to limit the present disclosure. A person of ordinary skill in that art can make various modification and improvements without departing from the spirit and scope of the present disclosure. Therefore, the protection scope of the present disclosure is subject to the scope defined by the claims.

What is claimed is:

1. An optical assembly, applied to a mobile terminal comprising a camera, wherein the optical assembly comprises: a cover plate, an optical transparent adhesive, a polarizer, a display panel, and a first antireflection coating, wherein the cover plate is light-transmissive and adheres to a first surface of the polarizer using the optical transparent adhesive;

a second surface of the polarizer adheres to a first surface of the display panel; the polarizer is provided with a through-hole at a location corresponding to the camera;

the display panel is provided with a through-hole area at the location corresponding to the camera; and the display panel comprises a display substance, and the display substance is not comprised in the through-hole area; and the first antireflection coating is disposed on the first surface of the display panel at the location corresponding to the camera; within the through-hole area, the first antireflection coating covers the first surface of the display panel, the polarizer covers a top surface of the first antireflection coating, and the first antireflection coating is configured to reduce reflectivity of incident light entering the camera.

2. The optical assembly as claimed in claim 1, wherein a second antireflection coating is disposed on an outer surface of the cover plate away from the camera.

3. The optical assembly as claimed in claim 2, wherein the first antireflection coating covers the outer surface of the cover plate away from the camera.

4. The optical assembly as claimed in claim 1, wherein the display panel comprises an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and a second antireflection coating is disposed in a hollow area in the opaque hollow column body.

5. The optical assembly as claimed in claim 2, wherein the display panel comprises an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the first antireflection coating is disposed on a first surface of the color film substrate.

6. The optical assembly as claimed in claim 2, wherein the display panel comprises an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and a third antireflection coating is disposed on a surface of the array substrate away from the camera.

7. The optical assembly as claimed in claim 2, wherein the display panel comprises an array substrate, a color film substrate, and liquid crystal, the array substrate and the color film substrate are cell-assembled together, and the liquid crystal is disposed between the array substrate and the color film substrate, and within the through-hole area, the display panel is further provided with an opaque hollow column body; and the first antireflection coating is disposed on a first surface of the color film substrate, and a third antireflection coating is disposed on a surface of the array substrate away from the camera.

8. The optical assembly as claimed in claim 2, wherein the second antireflection coating comprises a first light-transmissive film layer and a second light-transmissive film layer, the first light-transmissive film layer is disposed on a side surface of the second light-transmissive film layer away from the camera, and the second light-transmissive film layer is disposed on a transparent plate; and a refractive index of the first light-transmissive film layer is less than a refractive index of the second light-transmissive film layer, and the refractive index of the second light-transmissive film layer is greater than a refractive index of the transparent plate.

9. The optical assembly as claimed in claim 8, wherein the transparent plate comprises at least one of the cover plate, the display panel, an array substrate, and a color film substrate.

10. The optical assembly as claimed in claim 8, wherein a thickness of the first light-transmissive film layer is equal to odd-numbered times a quarter wavelength of the incident light.

11. The optical assembly as claimed in claim 8, wherein a thickness of the second light-transmissive film layer is equal to odd-numbered times a quarter wavelength of the incident light.

12. The optical assembly as claimed in claim 8, wherein a thickness of the first light-transmissive film layer is the same as that of the second light-transmissive film layer.

13. The optical assembly as claimed in claim 8, wherein the refractive index of the first light-transmissive film layer is 1.3, and the refractive index of the second light-transmissive film layer is 1.5.

14. The optical assembly as claimed in claim 8, wherein the material of the first light-transmissive film layer comprises magnesium fluoride, and the material of the second light-transmissive film layer comprises indium tin oxide.

15. A display apparatus, comprising a camera and the optical assembly as claimed in claim 1.

* * * * *